US012343855B2

(12) United States Patent
Knyrim (10) Patent No.: US 12,343,855 B2
(45) Date of Patent: Jul. 1, 2025

(54) SPRING ELEMENT AND COUPLING DEVICE (71) Applicant: Hilti Aktiengesellschaft, Schaan (LI)

(72) Inventor: Maximilian Knyrim, Ehingen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/038,117

(22) PCT Filed: Nov. 11, 2021

(86) PCT No.: PCT/EP2021/081345
§ 371 (c)(1),
(2) Date: May 22, 2023

(87) PCT Pub. No.: WO2022/112010
PCT Pub. Date: Jun. 2, 2022

(65) Prior Publication Data
US 2024/0100676 A1 Mar. 28, 2024

(30) Foreign Application Priority Data
Nov. 30, 2020 (EP) ..................................... 20210523

(51) Int. Cl.
*B25B 27/10* (2006.01)
*B25B 27/14* (2006.01)
*B25F 5/00* (2006.01)

(52) U.S. Cl.
CPC ..................................... *B25F 5/00* (2013.01)

(58) Field of Classification Search
CPC . B25B 27/10; B25B 27/146; F16H 2001/323; F16H 2001/325
(Continued)

(56) References Cited

U.S. PATENT DOCUMENTS 2,822,677 A * 2/1958 Reynolds .................. F16F 1/16
464/157
3,131,554 A * 5/1964 Hornschuch ........ B25B 23/1405
74/440
(Continued)

FOREIGN PATENT DOCUMENTS

DE 102018121971 A1 3/2020
EP 1055488 A2 11/2000
(Continued)

OTHER PUBLICATIONS

International Search Report of PCT/EP2021/081220 dated Feb. 1, 2022.
(Continued)

*Primary Examiner* — Thanh K Truong
*Assistant Examiner* — Patrick B Fry
(74) *Attorney, Agent, or Firm* — Davidson Kappel LLC (57) ABSTRACT Power tool, in particular a pipe press, including a drive, a transmission device, a threaded spindle drive and a linear actuator, wherein a torque generated by the drive is transmissible via the transmission device and the threaded spindle drive to the linear actuator. The power tool includes a coupling device for converting a rotational movement generated by the transmission device into a linear movement, to be transmitted to the threaded spindle drive, from the transmission device to the threaded spindle drive, wherein at least one spring element for reducing torsion acting on the coupling device is comprised.

12 Claims, 5 Drawing Sheets

(58) Field of Classification Search
USPC .............................. 72/416; 173/213; 475/178
See application file for complete search history.

(56) References Cited

U.S. PATENT DOCUMENTS

| | | | |
|---|---|---|---|
| 3,174,559 A * | 3/1965 | Vaughn | ............... B25B 23/1453 192/150 |
| 3,392,793 A * | 7/1968 | Pauley | ............... B25B 23/1405 173/93.7 |
| 3,442,177 A * | 5/1969 | Katarskas | ............ B25B 23/145 415/36 |
| 3,592,087 A * | 7/1971 | Pauley | .................... B25B 21/02 173/176 |
| 3,768,577 A * | 10/1973 | Leoni | ...................... B25B 21/02 173/93 |
| 5,195,354 A | 3/1993 | Yasui et al. | |
| 5,505,668 A * | 4/1996 | Koriakov-Savoysky | .................... F16H 1/32 74/462 |
| 5,511,439 A | 4/1996 | Navas | |
| 6,415,641 B1 | 7/2002 | Wagner et al. | |
| 8,475,315 B2 * | 7/2013 | Kobayashi | ............. B62M 11/16 74/411 |
| 9,808,851 B2 * | 11/2017 | Thorson | .................. F16H 25/20 |
| 2005/0103170 A1 | 5/2005 | Del Rio et al. | |
| 2012/0284981 A1 | 11/2012 | Bungter et al. | |
| 2013/0225354 A1 * | 8/2013 | Katoh | ....................... F16H 1/32 475/178 |
| 2017/0266791 A1 | 9/2017 | Barezzani et al. | |
| 2021/0339367 A1 | 11/2021 | Frenken et al. | |
| 2021/0402585 A1 | 12/2021 | Hinterstoisser et al. | |

FOREIGN PATENT DOCUMENTS

| | | |
|---|---|---|
| EP | 2532480 A2 | 12/2012 |
| EP | 3075492 A1 | 10/2016 |
| FR | 3010254 A1 | 3/2015 |
| WO | WO 2020099123 A1 | 5/2020 |
| WO | WO2022111998 A1 | 6/2022 |
| WO | WO 2022112010 A1 | 6/2022 |
| WO | WO 2022112021 A1 | 6/2022 |

OTHER PUBLICATIONS

International Search Report of PCT/EP2021/081503 dated Jan. 31, 2022.

International Search Report of PCT/EP2021/081345 dated Jan. 20, 2022.

* cited by examiner

SPRING ELEMENT AND COUPLING DEVICE

The invention relates to a power tool, in particular a pipe press, comprising a drive, a transmission device, a threaded spindle drive and a linear actuator, wherein a torque generated by the drive is transmissible via the transmission device and the threaded spindle drive to the linear actuator.

BACKGROUND

Various power tools for deformation and cutting processes are known from the prior art. By means of these special power tools, it is for example possible for reinforcement bars to be severed, for pipes to be mechanically connected or for hose clamps to be pressed on. The mechanical connection tasks also include so-called crimping, flanging and squeezing.

In order to realize the high pressing forces required for the crimping of steel pipes, for example, commercially available deformation machines have a pressing head which is driven by a pressing cylinder. Here, the pressing cylinder is commonly hydraulically driven for the purposes of moving the pressing head. An electric motor drives, in turn, a hydraulic pump, which outputs the linear movement of the pressing cylinder. Alternatively, there are also commercially available mechanical pressing, cutting and crimping tools which, instead of the hydraulics, generate the pressing pressure by means of a threaded spindle drive in combination with an electric motor. Here, the rotational movement of the electric motor is transformed by means of a threaded spindle into a linear movement to a linear actuator. These power tools commonly comprise a transmission which is connected between the threaded spindle drive and electric motor and which serves for reducing the required motor torque, in order to thus be able to dimension the motor to be smaller.

SUMMARY OF THE INVENTION

These power tools known from the prior art frequently have the problem, however, that the threaded spindle drive is exposed to relatively high mechanical loading when the threaded spindle drive is either in a fully extended position or in a fully retracted position. These two extreme positions of the threaded spindle drive are also referred to as "reaching the limits". In this state, a relatively high force and torque are applied, inter alia, to the motor, transmission, coupling, threaded spindle drive and linear actuator. At the same time, the motor is subjected to a high current intensity (known as the blocking current). The high force application, the high torque and the high current intensity can result in permanent damage to the power tool.

It is an object of the present invention to provide a power tool, in particular a pipe press, comprising a drive, a threaded spindle drive and a linear actuator in order to solve the abovementioned problems.

The present invention provides a power tool, in particular a pipe press, comprising a drive, a transmission device, a threaded spindle drive and a linear actuator, wherein a torque generated by the drive is transmissible via the transmission device and the threaded spindle drive to the linear actuator.

According to the invention, the power tool comprises a coupling device for converting a rotational movement generated by the transmission device into a linear movement, to be transmitted to the threaded spindle drive, from the transmission device to the threaded spindle drive, wherein at least one spring element for reducing torsion acting on the coupling device is comprised.

According to one advantageous exemplary embodiment, it may be possible for the coupling device having a sleeve and a piston for converting a rotational movement generated by the transmission device into a linear movement, to be transmitted to the threaded spindle drive, from the transmission device to the threaded spindle drive, wherein a toothed profile for connecting the piston to the sleeve for conjoint rotation therewith is contained between the sleeve and the piston, with the result that the piston is arranged in a manner which allows it to move axially relative to the sleeve and to rotate with the threaded spindle drive, and wherein the at least one spring element is an integral component of the piston.

As a result, the spring element can be positioned in a particularly space-saving manner in the coupling device.

According to one advantageous exemplary embodiment, it may be possible for the at least one spring element to be embodied as a torsion bar spring. As a result, the function of the spring element and of the piston can be combined particularly effectively in a single component and installation space in the interior of the power tool can be saved. The torsion bar spring can also be referred to as a torsion spring.

According to a further advantageous exemplary embodiment, it may be possible for the spring element to be embodied as a first rotary coil spring and a second rotary coil spring, wherein the first and second rotary coil springs are arranged with respect to one another such that the respective turns of the two rotary coil springs extend in opposite directions of rotation.

Further advantages will become apparent from the following description of the figures.

Various exemplary embodiments of the present invention are illustrated in the figures.

The figures, the description and the patent claims contain numerous features in combination. A person skilled in the art will expediently also consider the features individually and combine them to produce useful further combinations.

BRIEF DESCRIPTION OF THE DRAWINGS

In the figures, identical and similar components and assemblies are denoted by the same reference signs. Specifically.

DETAILED DESCRIPTION

Figure 1:
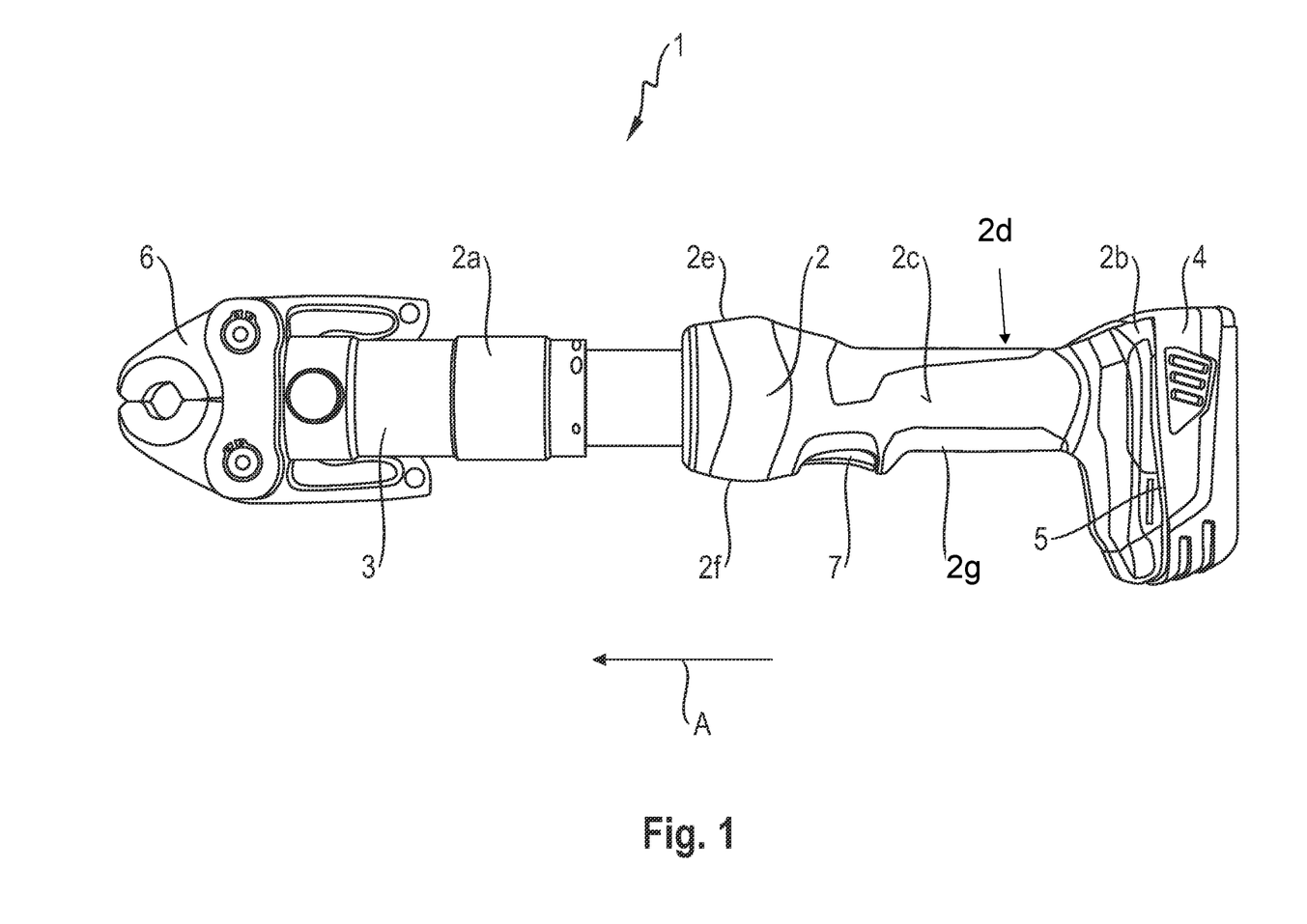
FIG. 1 shows a side view of a power tool according to the invention in the form of a pipe press.
Figure 2:
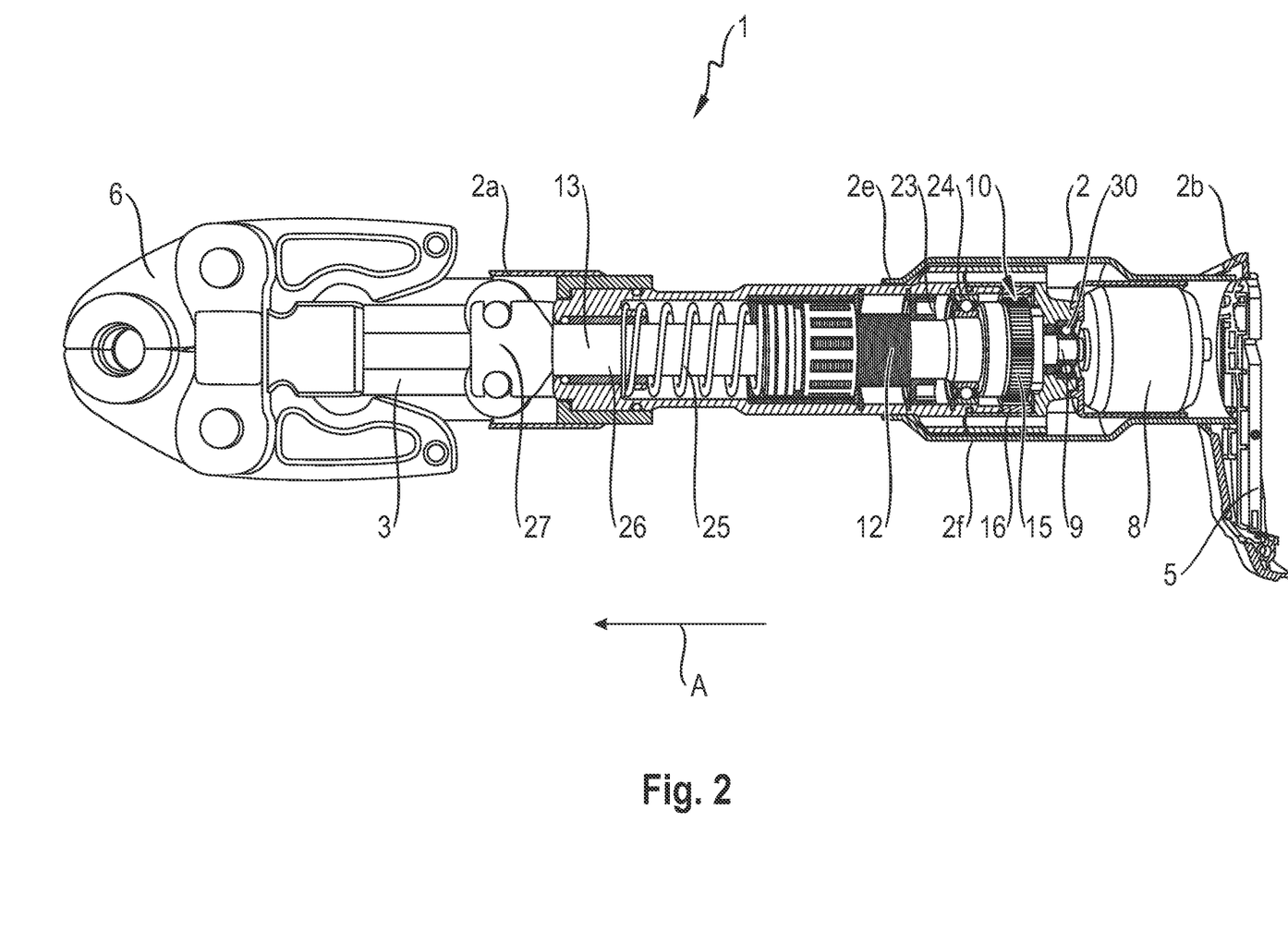
FIG. 2 shows a sectional side view of the power tool in the exemplary form of a pipe press, with a drive, a coupling device, a threaded spindle drive, a linear actuator and a transmission device.

FIGS. 1 and 2 show a power tool 1 according to the invention in an exemplary embodiment as a pipe press. Instead of the embodiment as a pipe press, the power tool 1 may also be embodied as any other cutting or deformation tool. In particular, it is also possible for the power tool 1 according to the invention to be embodied as a dispensing apparatus for chemical substances, such as adhesive or plugging compound. Such dispensing apparatuses can also be referred to as dispensers.

As can be seen in FIG. 1, the power tool 1 embodied as a pipe press substantially has a housing 2, a tool fitting 3 and a power supply 4.

The housing 2 of the power tool 1 is of substantially cylindrical form and comprises a front end 2a, a rear end 2b, a left-hand side surface 2c, a right-hand side surface 2d, an upper side 2e and a lower side 2f. A central part 2g of the housing 2 serves as a handgrip for allowing the power tool 1 to be held and controlled.

The energy supply 4 is positioned at the rear end 2b of the housing 2 of the power tool 1. In the present exemplary embodiment, the power supply 4 is in the form of a rechargeable battery (also referred to as power pack or battery). The power supply 4 in the form of a rechargeable battery may be detachably connected by means of an interface 5 to the rear end 2b of the housing 2 of the power tool 1. The power tool 1 or the electrical consumers of the power tool 1 is or are supplied with electrical power by means of the rechargeable battery 4.

In an alternative embodiment of the present invention, the power supply 4 of the power tool 1 may also be embodied as an electrical cable for detachably connecting the power tool 1 to an electrical grid source (that is to say electrical socket).

The tool fitting 3, for detachably receiving and holding a tool 6, is positioned at the front end 2a of the housing 2 of the power tool 1. In the present exemplary embodiment, a tool 6 in the form of a deformation tool is positioned at the tool fitting 3. In the present exemplary embodiment, the deformation tool 6 is embodied as a so-called pressing head. The deformation tool 6 embodied as a pressing head serves substantially for the processing and in particular deformation of lines, that is to say pipes and tubes. During the deformation process, it is substantially the diameter of the lines which is reduced with the aid of the tool embodied as a pressing head. The lines are not shown in the figures.

An activation switch 7 is positioned on the lower side 2f of the housing 2 of the power tool 1. The power tool 1 can be started and stopped by means of the activation switch 7.

Substantially a drive 8, a drive shaft 9, a transmission device 10, a coupling device 11, a threaded spindle drive 12 and a linear actuator 13 are positioned in the interior of the housing 2 of the power tool 1. In the present exemplary embodiment, the drive 8 is embodied as a brushless electric motor.

In the present exemplary embodiment, the transmission device 10 is embodied as an eccentric transmission device. According to an alternative embodiment, the transmission device may also be embodied in a form other than an eccentric transmission device.

Figure 5:
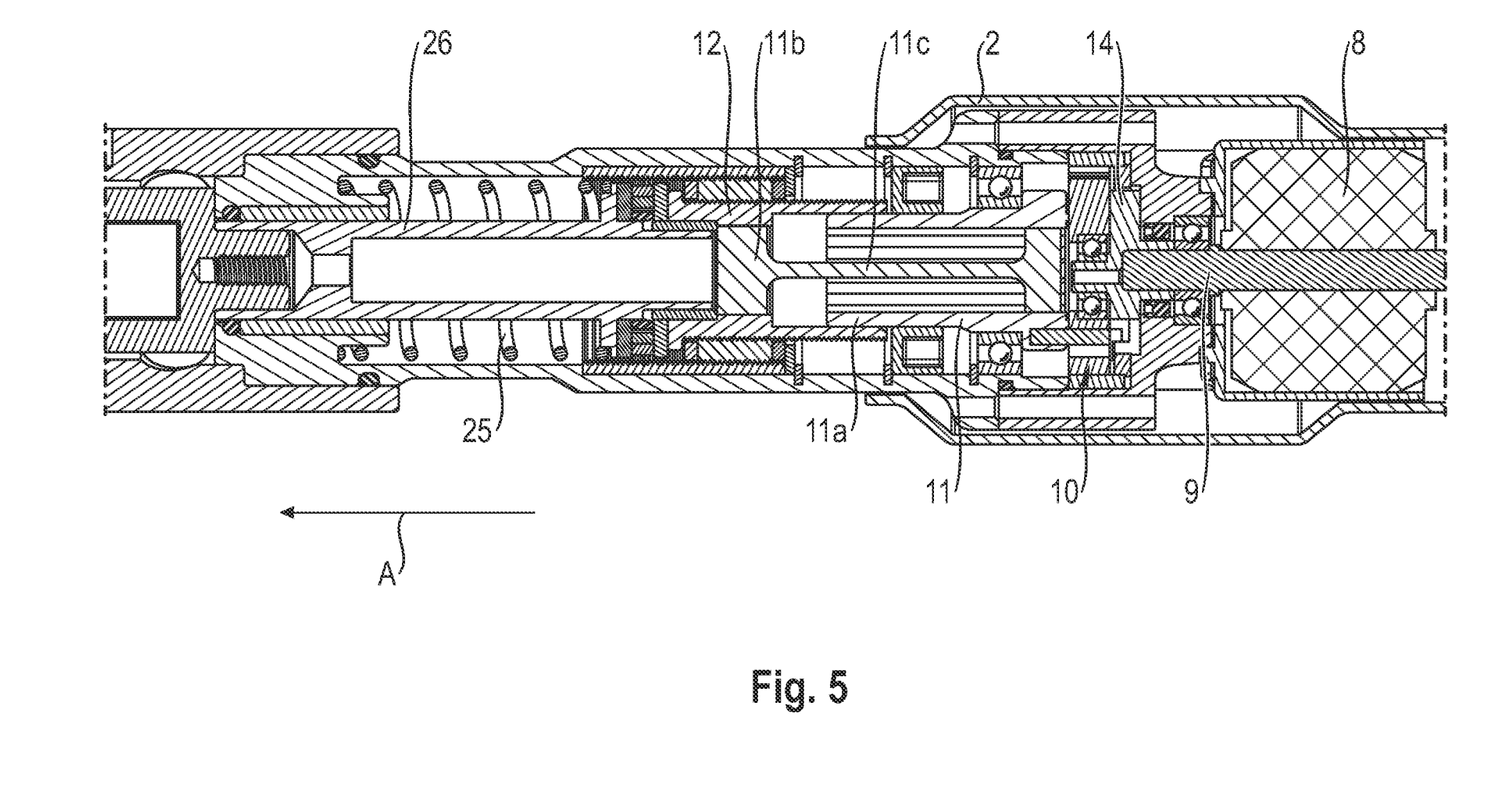
FIG. 5 shows a sectional side view of a partial region of the interior of the power tool in a first state.

As illustrated in FIGS. 2 and 5, the drive 8 embodied as a brushless electric motor is connected via the drive shaft 9 to the transmission device 10 embodied as an eccentric transmission device. By means of the connection to the drive shaft 9, a torque generated in the drive 8 is transmitted from the drive 8 to the transmission device 10.

A rotational speed ratio between the drive 8 and the output shaft 11 can be generated by means of the transmission device 10.

Figure 3:
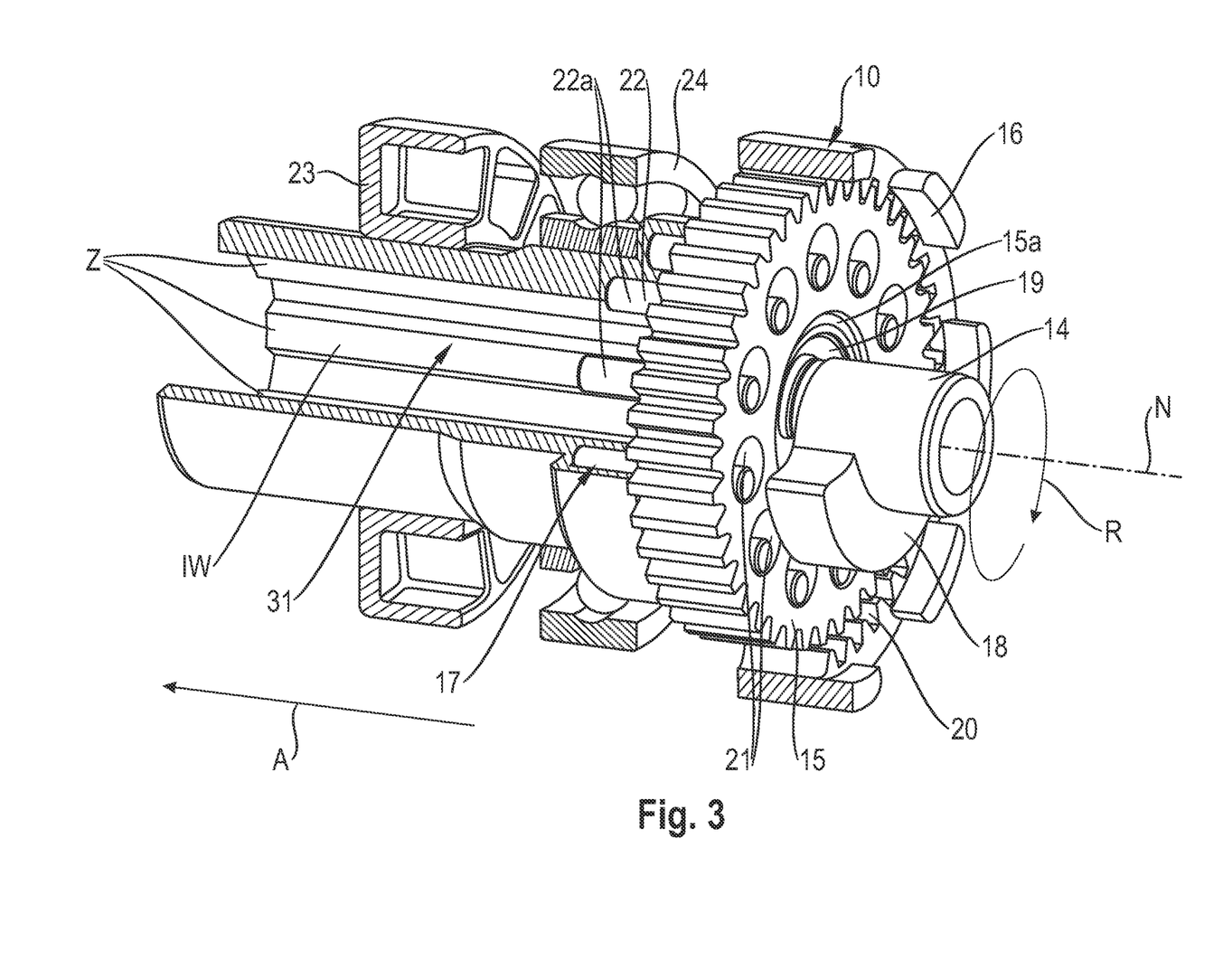
FIG. 3 shows a perspective sectional view of the transmission device with a part of the coupling device and a first and second bearing.

As shown especially in FIG. 3, the transmission device 10 embodied as an eccentric transmission device furthermore substantially comprises a drive eccentric 14, an eccentric gear 15, a ring gear 16, and a compensating coupling 17. The drive eccentric 14 has a compensating weight 18 (also referred to as a balance weight or balancing weight), which is connected to the drive 8 via the drive shaft 9. A bearing 30 is positioned between the drive eccentric 14 and the drive 8, cf. FIGS. 6 and 7. The eccentric gear 15 contains an aperture 15 for a ball bearing 19. The drive eccentric 14 is fitted into the ball bearing 19 and is thereby connected to the eccentric gear 15 for conjoint rotation therewith. Rotation of the drive eccentric 14 in the direction of rotation R also causes the eccentric gear 15 to rotate accordingly with a wobbling motion.

Moreover, the eccentric gear 15 is positioned in the ring gear 16. The ring gear 16 is connected to the inside of the housing 2 of the power tool 1 in a rotationally fixed manner. The eccentric gear 15 and the ring gear 16 have an involute toothing 20, cf. FIG. 3.

Furthermore, the eccentric gear 15 contains a number of apertures 21 arranged in a circle around the drive eccentric 14. In the exemplary embodiment which is shown in the figures, the apertures 21 are in the form of eleven through holes. However, there may also be more or fewer than eleven through holes. According to an alternative embodiment, the apertures 21 can also be formed as blind holes. The blind holes are arranged in such a way that the respective closed end of a blind hole is arranged counter to arrow direction A, and the open end of the blind hole faces in arrow direction A.

In the present exemplary embodiment, the compensating coupling 17 is embodied as a parallel crank coupling with coupling elements 22. Each of the through holes 21 of the eccentric gear 15 serves to receive a coupling element 22. In the present exemplary embodiment, the coupling elements 22 are embodied as coupling pins.

The compensating coupling 17 may therefore be referred to as a parallel crank coupling or alternatively as a pin or crank coupling.

As can likewise be seen in FIG. 3, the free end 22a of each coupling pin 22 projects from the through holes 21 of the eccentric gear 15 in arrow direction A. The free ends 22a of each coupling pin 22 are in turn connected to the coupling device 11 in such a way that a torque can be transmitted from the coupling pins 22 of the compensating coupling 17 to the output shaft 11.

Figure 4:
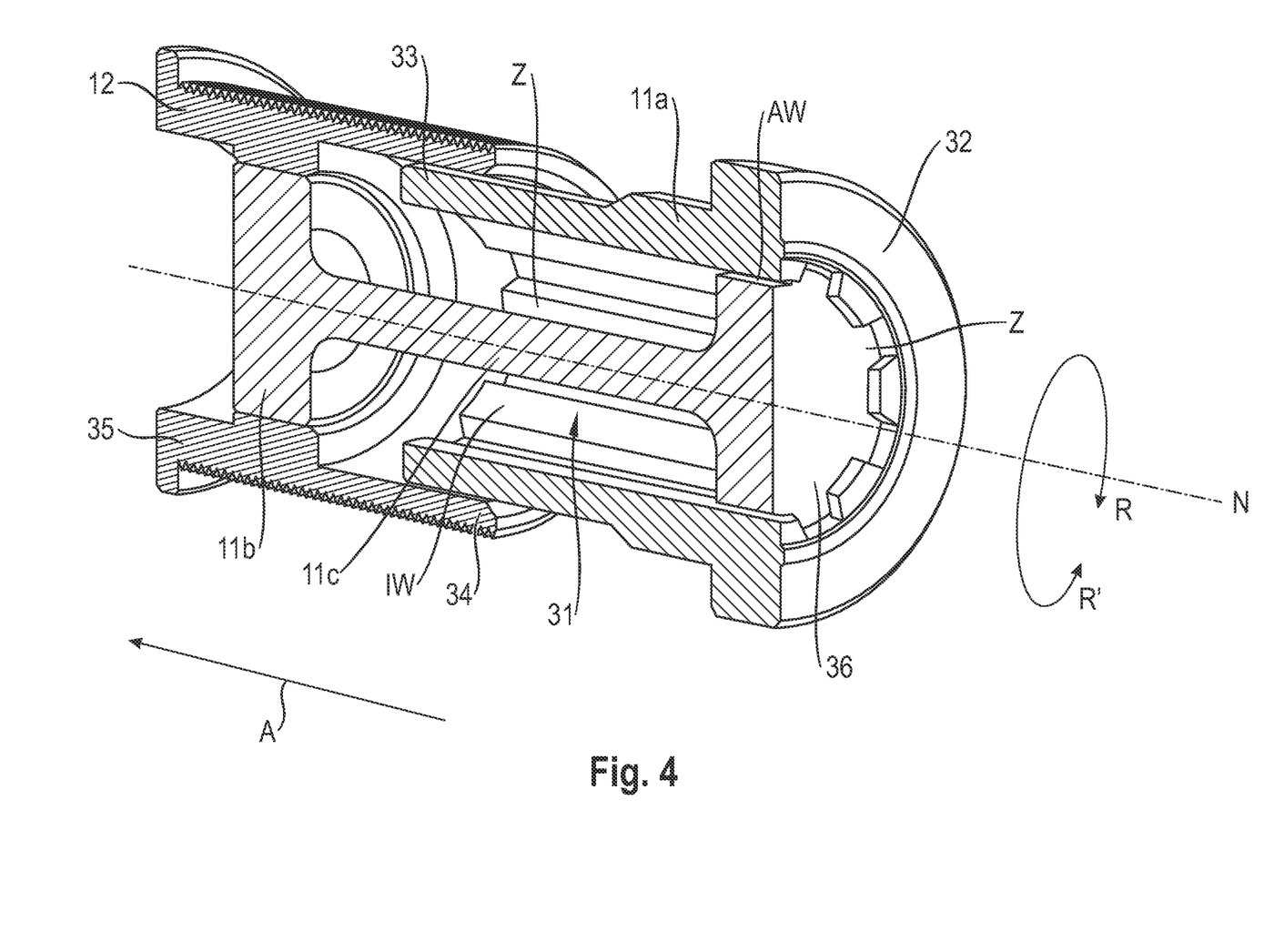
FIG. 4 shows a perspective sectional view of the coupling device.

The coupling device 11 has a substantially cylindrical shape and comprises a sleeve 11a, a piston 11b and a spring element 11c.

In principle, the coupling device 11 functions here as an output shaft from the transmission device 10 to the threaded spindle drive 12.

As can be seen in FIG. 4, the piston 11b is positioned in the interior of the sleeve 11a. The sleeve 11a has a cylindrical basic shape with a first end 32 and a second end 33. A step is provided between the first end 32 and the second end 33 of the sleeve, and therefore the outer shell of the sleeve 11a has a first diameter and a second diameter. Here, the first diameter is greater than the second diameter. As shown in FIG. 4, the first diameter is positioned ahead of the second diameter in arrow direction A. The inside diameter of the sleeve 11a has a constant diameter. The piston 11b likewise has a substantially cylindrical basic shape with a first end 34 and a second end 35. At the first end 34, the piston 11b has a gear element 36. The second end 35 of the piston 11b is connected to the threaded spindle drive 12 for conjoint rotation therewith, thus enabling a rotational movement of the piston 11b to be transmitted to the threaded spindle drive 12.

The spring element 11c is embodied as a torsion bar spring in the exemplary embodiment which is illustrated in the figures. Furthermore, the spring element 11c embodied as a torsion bar spring is a component or integral component of the piston 11b. As shown in FIGS. 4 and 5, the spring element 11c is positioned between the first end 34 and the second end 35 of the piston 11b. The dimensions and in particular the diameter of the spring element embodied as a torsion bar spring should be selected such that when torsion acts on the coupling device 11, the spring element 11c can be turned either in the direction of rotation R or R' in order to absorb torsional forces. High torsions or torsional forces can act on the spring element when the threaded spindle drive 12 connected to the spring element 11c for conjoint rotation therewith is in a fully extended position or in a fully retracted position.

A toothed profile 31 for connecting the piston 11b to the sleeve 11a for conjoint rotation therewith is contained between an outer wall AW of the piston 11b and an inner wall IW of the sleeve 11a. The toothed profile 31 comprises a multiplicity of teeth Z, extending in arrow direction A, on the inner wall IW of the sleeve, and correspondingly configured teeth Z on the gear element 36 of the piston 11b. In the present exemplary embodiment, the cross-sectional area of each tooth Z is in the form of a symmetrical trapezoid, cf. FIG. 4. According to alternative embodiments, however, the cross-sectional area of a tooth Z can assume virtually any possible symmetrical or asymmetrical shape.

By virtue of the toothed profile 31 between the outer wall AW of the piston 11b and the inner wall IW of the sleeve 11a, the piston 11b is, on the one hand, connected to the sleeve 11a for conjoint rotation therewith and, on the other hand, the piston 11b can be moved axially in arrow direction A in the interior of the sleeve 11a. (See, e.g., FIG. 4).

By means of a main bearing 23 and a secondary bearing 24 (see, e.g., FIG. 2), the coupling device 11 is mounted in the interior of the housing 2 of the power tool 1. The main bearing 23 is positioned on the second diameter of the sleeve 11a, and the secondary bearing 24 is positioned on the first diameter of the sleeve. The main bearing 23 is embodied as a rolling bearing or ball bearing, and the secondary bearing 24 is embodied as a sliding bearing. According to an alternative exemplary embodiment, both the main bearing 23 and the secondary bearing 24 can be embodied either as a rolling bearing or a sliding bearing. According to an alternative embodiment, it is also possible for just a single bearing to be provided.

As already described above, the coupling device 11 is connected to the compensating coupling 17 of the transmission device 10. The coupling device 11, in turn, is connected to the threaded spindle drive 12. The rotational movement of the coupling device 11 can be converted into a linear movement by means of the threaded spindle drive 12.

As can be seen from the figures, the threaded spindle drive 12 is connected to the linear actuator 13.

By virtue of the rotational movement of the drive shaft 9 in direction of rotation R around the axis of rotation N, the sleeve 11a and the piston 11b, inter alia, likewise rotate in direction of rotation R around the axis of rotation N, as a result of which the piston 11b is pushed in arrow direction A.

FIG. 5 shows the piston 11b in a first position, or the piston device 11 in a first state, wherein the piston 11b is still in an initial position. The first end 34 of the piston 11b with the gear element 36 is still situated substantially at the transmission device 10. The threaded spindle drive 12 is in a fully retracted position here and a certain torsional force acts on the spring element in direction of rotation R.

If the piston 11b is moved further in arrow direction A, the gear element 36 is situated approximately in the middle of the sleeve 11a. The axial movement of the piston 11b in arrow direction A also results in the movement of the thrust rod 26 in arrow direction A. The threaded spindle drive 12 moves out of the fully retracted position and no torsional force acts on the spring element.

If the piston 11b is moved even further in arrow direction A, the gear element 36 of the piston 11b is situated at the second end 33 of the sleeve 11a. The thrust rod 26 has now been pushed to the maximum extent in arrow direction A by the piston 11b. The threaded spindle drive 12 is in a fully extended position here and a certain torsional force acts on the spring element in direction of rotation R'.

The linear actuator 13 comprises substantially a compression spring 25 and a thrust rod 26. Here, the compression spring 25 acts as a restoring spring for the linear actuator 13.

A force flow diverting device 27 is provided at the linear actuator 13. By means of the linear actuator 13 and the force flow diverting device 27, the linear force of the linear actuator 13 is transmitted to the tool fitting 3 such that the tool 6 in the form of a pressing head can be moved between an open and a closed position.

The drive 8, which is embodied as an electric motor, can rotate with a rotational speed value of between 10 000 and 30 000 rpm at a maximum extension and retraction speed of the linear actuator 13. In particular, a rotational speed value of between 15 000 and 18 000 rpm is provided for the drive 8.

LIST OF REFERENCE SIGNS

1 Power tool
2 Housing
2a Front end 2a of the housing
2b Rear end of the housing
2c Left-hand side surface of the housing
2d Right-hand side surface of the housing
2e Upper side of the housing
2f Lower side of the housing
3 Tool fitting
4 Power supply
5 Interface
6 Tool
7 Activation switch
8 Drive
9 Drive shaft
10 Transmission device
11 Coupling device
11a Sleeve
11b Piston
11c Spring element
12 Threaded spindle drive
13 Linear actuator
14 Drive eccentric
15 Eccentric gear
15a Aperture in the eccentric gear
16 Ring gear
17 Compensating coupling
18 Compensating weight
19 Ball bearing
20 Involute toothing
21 Apertures in the eccentric gear
22 Coupling element
22a Free end on the coupling element
23 Main bearing
24 Secondary bearing 25 Compression spring
26 Thrust rod
27 Force flow diverting device
30 Bearing
31 Toothed profile
32 First end of the sleeve
33 Second end of the sleeve
34 First end of the piston
35 Second end of the piston
36 Gear element
AW Outer wall of the piston
IW Inner wall of the sleeve
Z Teeth of the toothed profile

What is claimed is:

1. A power tool comprising:
a drive;
a transmission device;
a threaded spindle drive;
a linear actuator, a torque generated by the drive being transmissible via the transmission and the threaded spindle drive to the linear actuator;
a coupling for converting a rotational movement generated by the transmission into a linear movement, to be transmitted to the threaded spindle drive, from the transmission device to the threaded spindle drive; and
at least one spring for reducing torsion acting on the coupling
wherein the transmission device includes:
a drive eccentric;
a compensating coupling; and
an eccentric gear, wherein the eccentric gear comprises an aperture for a ball bearing; wherein the eccentric gear is positioned in a ring gear, the ring gear being rotationally fixed to a housing of the power tool;
wherein the coupling has a sleeve and is mounted in the housing of the power tool by a main bearing and a secondary bearing, the main bearing being placed on the second diameter of the sleeve and the secondary bearing being placed on the first diameter of the sleeve.

2. The power tool as recited in claim 1 wherein the coupling has a piston for converting a rotational movement generated by the transmission device into a linear movement, to be transmitted to the threaded spindle drive, from the transmission and threaded spindle drive, wherein a toothed profile for connecting the piston to the sleeve for conjoint rotation therewith is contained between the sleeve and the piston, with the result that the piston is arranged in a manner permitting the piston to move axially relative to the sleeve and to rotate with the threaded spindle drive, the at least one spring being an integral component of the piston.

3. The power tool as recited in claim 1 wherein the at least one spring is embodied as a torsion bar spring.

4. The power tool as recited in claim 1 wherein the drive is a brushless electric motor.

5. The power tool as recited in claim 1 wherein the drive eccentric is connected to a compensating weight, the compensating weight being further connected to the drive.

6. The power tool as recited in claim 1 wherein the drive eccentric and the drive are connected to a bearing, the bearing being axially between the drive and the drive eccentric.

7. The power tool as recited in claim 1 wherein the drive eccentric is fitted into the ball bearing and thereby connected to the eccentric gear for conjoint rotation therewith.

8. The power tool as recited in claim 1 wherein the ring gear and the eccentric gear connect via involute toothing.

9. The power tool as recited in claim 1 wherein the main bearing and the secondary bearing are a rolling bearing or a sliding bearing.

10. The power tool as recited in claim 1 wherein the eccentric gear includes multiple apertures arranged radially around the drive eccentric.

11. The power tool as recited in claim 10 wherein the multiple apertures are through holes or blind holes.

12. A pipe press comprising the power tool as recited in claim 1.

* * * * *